(12) United States Patent
Foligno et al.

(10) Patent No.: US 12,111,174 B2
(45) Date of Patent: Oct. 8, 2024

(54) VIRTUAL GUIDE

(71) Applicant: Dr. Ing. h.c. F. Porsche Aktiengesellschaft, Stuttgart (DE)

(72) Inventors: Mark Foligno, Berlin (DE); Jochen Gross, Stuttgart (DE); Thilo Koslowski, Marbach am Neckar (DE); Don Metzler, Laveen, AZ (US); Thorsten Hayer, San Francisco, CA (US)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 426 days.

(21) Appl. No.: 16/505,881

(22) Filed: Jul. 9, 2019

(65) Prior Publication Data

US 2021/0010823 A1 Jan. 14, 2021

(51) Int. Cl.
| | | |
|---|---|---|
| *G01C 21/36* | (2006.01) | |
| *G01C 21/34* | (2006.01) | |
| *G06F 3/16* | (2006.01) | |
| *G06N 3/00* | (2023.01) | |
| *G06N 3/006* | (2023.01) | |
| *G06N 20/00* | (2019.01) | |

(52) U.S. Cl.
CPC ..... *G01C 21/3664* (2013.01); *G01C 21/3484* (2013.01); *G06F 3/167* (2013.01); *G06N 3/006* (2013.01); *G06N 20/00* (2019.01)

(58) Field of Classification Search
CPC ............ G01C 21/3664; G01C 21/3484; G06N 20/00; G06N 3/006; G06F 3/167
See application file for complete search history.

(56) References Cited

U.S. PATENT DOCUMENTS

| | | | | |
|---|---|---|---|---|
| 6,707,421 | B1 * | 3/2004 | Drury | G01C 21/3476 342/357.31 |
| 9,477,978 | B1 | 10/2016 | Oakes et al. | |
| 2002/0082771 | A1 * | 6/2002 | Anderson | G01C 21/3484 701/423 |
| 2004/0090121 | A1 | 5/2004 | Simonds et al. | |
| 2008/0201227 | A1 * | 8/2008 | Bakewell | G06Q 30/02 705/14.19 |
| 2010/0027527 | A1 * | 2/2010 | Higgins | H04L 67/306 370/351 |

(Continued)

*Primary Examiner* — Stephen S Hong
*Assistant Examiner* — Darrin Hope
(74) *Attorney, Agent, or Firm* — Buchanan Ingersoll & Rooney PC (57) ABSTRACT

A personal virtual agent for journey planning for a user of a vehicle, having a central processing unit, a user interface device for communication with at least one user-specific information memory, a vehicle interface device for communication with at least one vehicle-specific information memory, and a route interface device for communication with at least one information memory for routes. The central processing unit is embodied to take into consideration information from the user-specific information memory and/or information from the vehicle-specific information memory (to receive at least one route from the information memory for routes, and to take into consideration the information from the user-specific information memory and the information from the vehicle-specific information memory to select a route.

22 Claims, 3 Drawing Sheets

(56) References Cited

U.S. PATENT DOCUMENTS

| | | | | |
|---|---|---|---|---|
| 2010/0203868 A1* | 8/2010 | Sagie | ............... | G01C 21/20 |
| | | | | 455/414.1 |
| 2010/0205060 A1* | 8/2010 | Athsani | ............. | G01C 21/3484 |
| | | | | 705/14.58 |
| 2013/0325541 A1* | 12/2013 | Capriotti | ............. | G06Q 10/087 |
| | | | | 705/7.21 |
| 2014/0365107 A1* | 12/2014 | Dutta | ............... | G01C 21/343 |
| | | | | 701/538 |
| 2015/0168169 A1* | 6/2015 | Caceres | ............. | G08G 1/0133 |
| | | | | 701/400 |
| 2018/0238698 A1* | 8/2018 | Pedersen | ............ | G01C 21/3469 |
| 2018/0265095 A1* | 9/2018 | Joe | ............... | A61B 5/024 |
| 2019/0128686 A1* | 5/2019 | Epperlein | ............ | G01C 21/3461 |
| 2019/0378475 A1* | 12/2019 | Lim | ............... | G06F 3/04817 |

* cited by examiner

VIRTUAL GUIDE

FIELD OF THE INVENTION

The present invention relates to a personal virtual agent for journey planning for a user of a vehicle, having a central processing unit, a user interface device for communication with at least one user-specific information memory, a vehicle interface device for communication with at least one vehicle-specific information memory, a route interface device for communication with at least one information memory for routes.

The present invention relates moreover to a vehicle having a personal virtual agent as above.

The present invention likewise relates to a route planning system having a personal virtual agent as above, at least one user-specific information memory that has a communication link to the personal virtual agent via the user interface device, having at least one vehicle-specific information memory that has a communication link to the personal virtual agent via the vehicle interface device, and at least one information memory for routes that has a communication link to the personal virtual agent via the route interface device.

The present invention additionally relates to a method for journey planning for a user of a vehicle, comprising the steps of receiving user-specific information from at least one user-specific information memory, receiving vehicle-specific information from at least one vehicle-specific information memory.

BACKGROUND OF THE INVENTION

Various assistance systems are known in the prior art that are able to assist a user of a vehicle, usually the driver thereof, in different ways. By way of example, navigation systems can calculate routes to desired destinations and announce required driving maneuvers in order to get to a desired destination. This can involve preferences for a desired route being stipulated, for example in order to select challenging routes for a sports car, or else to reduce or avoid driving on freeways with a convertible. The route selection may also be adjusted to suit different ways in which the driver drives.

Furthermore, various driving assistance systems are known that relate to the driving itself, for example distance assist systems, lane departure warning systems, cruise control systems, road sign monitoring, to name but a few.

However, all these assistance systems are individual systems. A synergetic combination of different systems is not known to date.

US 2004/0090121 A1, which is incorporated by reference herein, discloses an infotainment system that provides and manages information onboard a vehicle efficiently. The infotainment system comprises an infogas means in order to acquire information from an external source. The infotainment system further comprises a context-based delivery system for delivering context-based information. The context-based information contains a vehicle context advisor for monitoring and storing information in regard to vehicle devices and to services available on the vehicle. The context advisor further comprises an advisor personalization context advisor for the monitoring and storage of personalization information made available to devices and services onboard the vehicle. The context advisor further comprises an environmental context advisor for the monitoring and storage of environmental information made available to devices and services on board the vehicle.

Further, U.S. Pat. No. 9,477,978 B1, which is incorporated by reference herein, discloses a system in order to advise a user about the state of a vehicle. The data can be collected from a vehicle in the form of images, or reflected energy from a section or a part of the vehicle, and the data can be analyzed in order to establish whether repairs, damage or other problems are present. The collected data can also to identify images are from panels or badges on the automobile. A report containing the results of the analysis can be made available the user. The results of the analysis can describe detected damage or repairs, they deliver vehicle history or identifying information, or an evidence of repainting report.

SUMMARY OF THE INVENTION

Against the background of the aforementioned prior art, the invention therefore relates to specifying a personal virtual agent for journey planning for a user of a vehicle, a vehicle having a personal virtual agent of this kind, a journey route planning system having a personal virtual agent of this kind and a method for journey planning for a user of a vehicle of the aforementioned type that allow simple and individual planning of routes for driving a vehicle.

According to aspects of the invention, a personal virtual agent for journey planning for a user of a vehicle is therefore specified, having a central processing unit, a user interface device for communication with at least one user-specific information memory, a vehicle interface device for communication with at least one vehicle-specific information memory, a route interface device for communication with at least one information memory for routes, wherein the central processing unit is embodied to take into consideration information from the user-specific information memory and/or information from the vehicle-specific information memory to receive at least one route from the information memory for routes, and to take into consideration the information from the user-specific information memory and the information from the vehicle-specific information memory to select a route.

According to aspects of the invention, a vehicle having a personal virtual agent as above is moreover specified.

According to aspects of the invention, a journey route planning system is likewise, having a personal virtual agent as above, at least one user-specific information memory that has a communication link to the personal virtual agent via the user interface device, having at least one vehicle-specific information memory that has a communication link to the personal virtual agent via the vehicle interface device, and at least one information memory for routes that has a communication link to the personal virtual agent via the route interface device.

According to aspects of the invention, a method for journey planning for a user of a vehicle is additionally specified, comprising the steps of receiving user-specific information from at least one user-specific information memory, receiving vehicle-specific information from at least one vehicle-specific information memory, receiving at least one route from at least one information memory for routes by taking into consideration information from the user-specific information memory and/or information from the vehicle-specific information memory, and selecting a route by taking into consideration the data from the user-specific information memory and the data from the vehicle-specific information memory.

A basic idea of the present invention is thus to first of all make a selection of possible routes by taking into consideration different information. The information can comprise information from the user-specific information memory and from the vehicle-specific information memory. Against this background, the at least one route is selected and is received from the information memory for routes. This is therefore a type of preselection from which, further taking into consideration the information from the user-specific information memory and the information from the vehicle-specific information memory, a route is selected. The selecting of the route can then also comprise the abandoning of the preselected at least one route. This involves the route being able, following the selection, to be continually adjusted based on updated information, for example if the user-specific information or the vehicle-specific information results in changes. Such changes can arise as a result of maintenance required on account of journeys in the meantime or as a result of changed appointments of the user, for example.

The routes can be selected depending on a journey destination in this case, for example by virtue of the location being ascertained from an appointment of the user and being used as the destination for determining the route, through to selection of a route as a pure leisure activity in order to enjoy driving the vehicle. In the latter case, the routes can be selected from available routes in a database, for example. The selection in this case can be made depending on existing calendar entries, for example, by virtue of the route being chosen such that a time window available in the calendar is used in optimum fashion. Should an appropriately selected and terminated route result in the route not being able to be completed in good time on account of a route closure or congestion, for example, the route is abandoned. If need be, another route can then be chosen that can be traveled in the time window as an alternative.

The personal virtual agent can, as a central device, access the different information memories. In this case, the personal virtual agent may be embodied as a standalone device or as software on a computer or a server. It is also possible for the personal virtual agent to be provided as a service in the cloud or as app on a mobile device. The personal virtual agent may be implemented in one piece, or can have different components that are provided separately. In particular, the personal virtual agent can comprise a mobile app, for example, which is used to use a mobile device, for example a mobile phone or a tablet, as a user interface. Accordingly, it is also possible for an entertainment system of a vehicle to be used as a user interface.

The user of a vehicle is usually the driver thereof when he begins the route. In principle, however, it is also possible for different users to access the vehicle and to alternately become the driver.

The central processing unit is usually embodied as a data processing device having a processor for processing the received information. The central processing unit may be implemented at, in principle, different locations, for example in a central server, more preferably as a cloud implementation. The method is implemented on the data processing device as software.

The various interface devices, in this case the user interface device, the vehicle interface device and the route interface device, are used for communication between the various memories and the central processing unit. The interface devices are in this case implemented as software, for example using an API. For the transmission of the information between the various memories and the central processing unit, the hardware can use an arbitrary network connection that is wired or wireless. A combination of different network types is also possible. The network connection can comprise an Internet connection in this case.

The communication between the central processing unit and the information memories can be effected in different ways in this case, these being dependent on a configuration of the information memory, for example.

The various information memories, in this case the user-specific information memory, the vehicle-specific information memory and the information memory for routes, can be provided in different ways. By way of example, the various information memories can be provided as databases. The databases are preferably provided independently of one another as separate databases. Alternatively, it is also possible for information from the various information memories to be provided dynamically, for example. As such, it is possible for information from the vehicle-specific information memory to be retrieved from the vehicle itself at any time, for example, so that the vehicle itself serves as an information memory. The information can then be read and provided by a processing unit of the vehicle as required in each case. Alternatively, the information from the vehicle-specific information memory can be stored in a database outside the vehicle in each case.

The vehicle may be an inherently arbitrary vehicle. The vehicle type and the drive type can be chosen independently in principle. The personal virtual agent is part of the vehicle, or is at least actuated by means of the vehicle, so that the personal virtual agent is associated with the vehicle, and access thereto is effected by means of the vehicle.

The journey route planning system comprises not only the personal virtual agent but also at least one user-specific information memory that has a communication link to the personal virtual agent via the applicable interface device. At least some of the applicable information memories are therefore part of the journey route planning system. The journey route planning system can be provided centrally in this case, or as a distributed system, in which the personal virtual agent and the information memories may be distributed arbitrarily over various single systems at an in principle arbitrary number of locations.

In an advantageous configuration of the invention, the personal virtual agent has a communication interface device for communication with at least one voice control module. The voice control allows convenient interaction between the user and the personal virtual agent. Accordingly, safe interaction with the personal virtual agent can take place even when driving the vehicle, for example.

The voice control module may be an externally connected voice control module that can be connected as an external interface via the communication interface device. Applicable voice control modules or voice recognition modules are known today as "Siri", "Cortana" or others, for example, and are experiencing increasing prevalence in a wide variety of areas, particularly in mobile communication, i.e. for use on mobile phones. Preferably, the voice control module is actuated by means of an input using the mobile phone, i.e. the mobile phone is used as an input medium for recognizing the voice.

In an advantageous configuration of the invention, the personal virtual agent has a memory interface device for communication with at least one memory module. The memory module can be used to store various information in regard to the user. Accordingly, it is additionally possible for this information accessed, used cloud memory or be in the form of such.

In an advantageous configuration of the invention, the personal virtual agent has an MMI interface device for communication with at least one MMI module. The MMI module is a module having a multimedia interface for processing multimedia information. Multimedia information is any type of image, video and sound information that can be processed individually or in combination. The MMI module therefore preferably comprises a camera having a microphone, which are actuated by the personal virtual agent individually or together. The camera may accordingly as a still camera, i.e. for taking single pictures, or as a video camera for taking picture sequences at a high frequency, i.e. of at least approximately 15 frames per second, typically 20 or more frames per second. In principle, the MMI module can also output applicable MMI information in this case, for example by virtue of audio signals being output via an infotainment system of the vehicle. When stationary, the infotainment system can furthermore be used to output video signals.

In an advantageous configuration of the invention, the personal virtual agent has a profile interface device for communication with at least one profile creation module. The profile creation module is a module that creates a profile of a user based on, by way of example, a way of driving the vehicle that is ascertained by the profile creation module, for example if the vehicle is driven in predominantly sporty fashion, for example on twisting country roads with frequent load changes, if the vehicle is driven predominantly on freeways or even racetracks, if the vehicle is used predominantly for a route to work or predominantly for leisure journeys, if the vehicle is driven in particularly fuel-saving fashion, to name but a few. Furthermore, the profile can comprise preferred routes or route sections, for example, and also preferred weather situations, preferred destinations for traveling a route, or others. Such profile information can in this case be ascertained autonomously by the vehicle itself or else by the personal virtual agent based on a previous behavior. Alternatively, or additionally, the user can also prescribe such profile information as a setting. The profile creation module is preferably designed to create profiles for a plurality of users. In this case, the profiles may be vehicle-specific, so that a profile comprises profile information for different vehicles, vehicle types or vehicle categories. Accordingly, it may make sense to store profile information in a central database and to provide it for retrieval by the personal virtual agent when a new user is recognized, for example.

In an advantageous configuration of the invention, the personal virtual agent has a supplementary information interface device for communication with at least one information database containing route-relevant supplementary information. The supplementary information can comprise any type of information that has relevance in regard to the selection of the route at the desired time. The supplementary information can therefore, by way of example, weather information, traffic information, i.e. information about congestion, roadworks and other aspects with resultant effects on a journey time or availability of the route, personal information such as calendars, tasks or email, information about traffic monitoring devices, information about points of interest along the route, infrastructure information, for example filling stations, restaurants, or other aspects, and also profile information from a driver profile, as an incomplete list. This information can be linked to the selection of the route, for example in order to take the weather as a basis for selecting a route that has appealing countryside or a challenge for the driver, while in poor, rainy weather a route is selected on efficiency grounds, for example. It is also possible for driving with the vehicle to be abandoned completely if the weather or the traffic information make it seem that a route for making an excursion or another journey as an end in itself is not sensibly feasible.

In an advantageous configuration of the invention, the personal virtual agent has a security interface device for communication with at least one security module. The security module causes secure communication via the connected interface devices. Furthermore, access to the personal virtual agent is limited to authorized users of the vehicle. The security module can therefore comprise recognition means in order to recognize a user of the vehicle. These are preferably biometric recognition means, for example for recognizing a fingerprint, a face or an iris of the user.

BRIEF DESCRIPTION OF THE DRAWINGS

The invention is explained by way of example below with reference to the accompanying drawings on the basis of preferred exemplary embodiments, the features presented below each being able to depict an aspect of the invention either individually or in combination.

In the drawings.

DETAILED DESCRIPTION OF THE DRAWINGS

Figure 1:
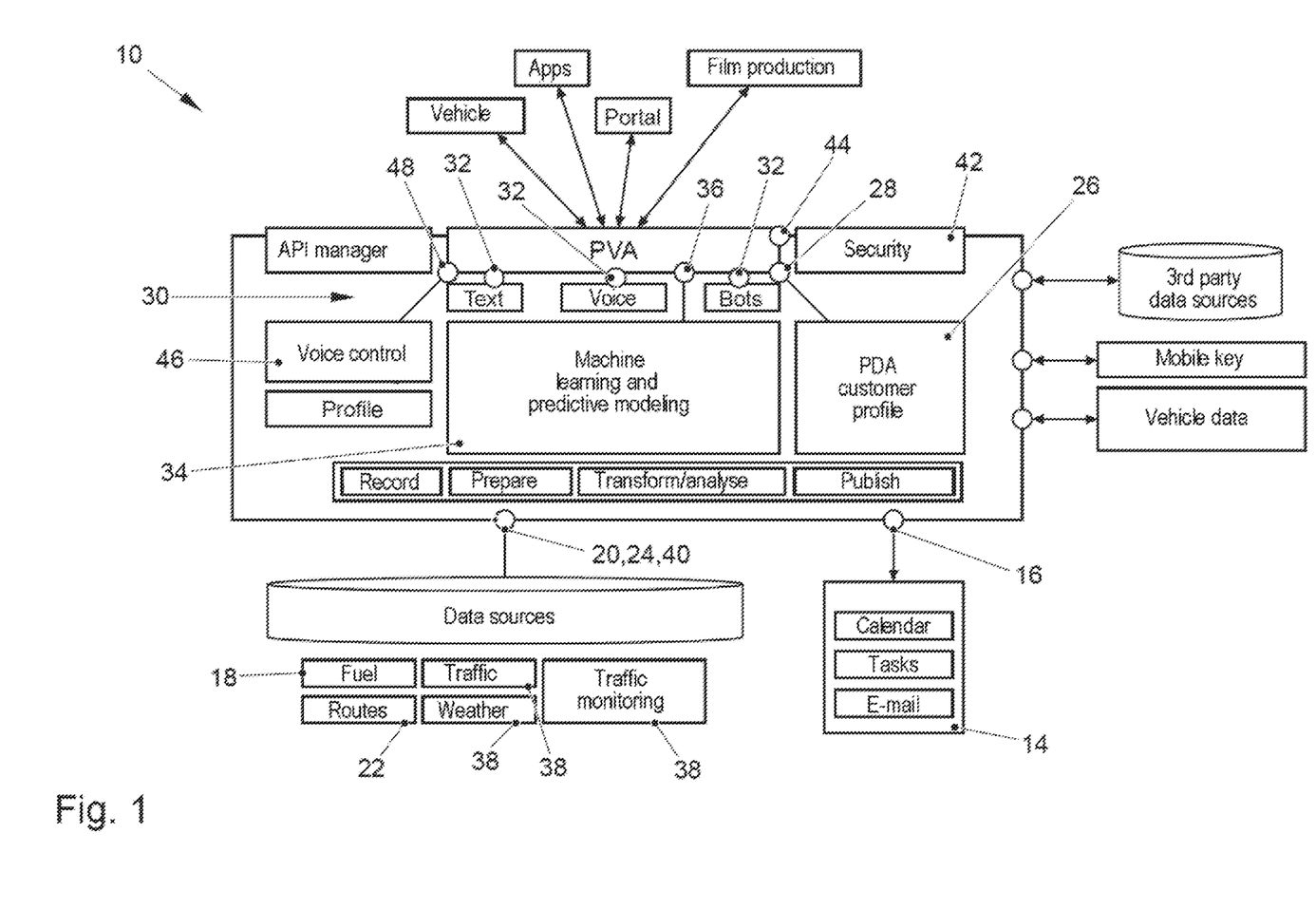
FIG. 1 shows a schematic overview of a software implementation of a journey route planning system having a personal virtual agent according to a first, preferred embodiment of the invention.

FIG. 1 shows a journey route planning system 10 according to aspects of the invention, according to a first, preferred embodiment of the invention.

The journey route planning system 10 of the first embodiment is depicted schematically as a software implementation in FIG. 1. The journey route planning system 10 comprises, as a central unit, a personal virtual agent 12 for journey planning for a user of a vehicle.

The personal virtual agent 12 comprises a central processing unit, which is not depicted separately in this case. The personal virtual agent 12 is embodied as software on a computer in this case. The personal virtual agent 12 is implemented in one piece in this case.

The central processing unit is embodied as a data processing device having a processor for processing received information.

The journey route planning system 10 comprises a user-specific information memory 14. The personal virtual agent 12 comprises a user interface device 16 for communication with the user-specific information memory 14. Accordingly, the user-specific information memory 14 has a communication link to the personal virtual agent 12 via the user interface device 16.

The journey route planning system 10 also comprises a vehicle-specific information memory 18. The personal virtual agent 12 comprises a vehicle interface device 20 for communication with the vehicle-specific information memory 18. Accordingly, the vehicle-specific information memory 18 has a communication link to the personal virtual agent 12 via the vehicle interface device 20.

The journey route planning system 10 additionally comprises an information memory for routes 22. The personal virtual agent 12 comprises a route interface device 24 for communication with the information memory for routes 22. Accordingly, the information memory for routes 22 has a communication link to the personal virtual agent 12 via the route interface device 24.

The journey route planning system 10 additionally comprises a memory module 26. The personal virtual agent 12 comprises a memory interface device 28 for communication with the memory module 26. Accordingly, the memory module 26 has a communication link to the personal virtual agent 12 via the memory interface device 28. The memory module 26 stores various information in regard to the user.

The journey route planning system 10 additionally comprises an MMI module 30. The personal virtual agent 12 comprises an MMI interface device 32 for communication with the memory module 26. Accordingly, the MMI module 30 has a communication link to the personal virtual agent 12 via the MMI interface device 32. The MMI module 30 is embodied in the style of a video camera having a camera and having a microphone in this case.

The journey route planning system 10 additionally comprises a profile creation module 34. The personal virtual agent 12 comprises a profile interface device 36 for communication with the profile creation module 34. Accordingly, the profile creation module 34 has a communication link to the personal virtual agent 12 via the profile interface device 36. The profile creation module 34 creates a profile of a user based on a way of driving the vehicle that is ascertained by the profile creation module 34, for example if the vehicle is driven in predominantly sporty fashion, for example on twisting country roads with frequent load changes, if the vehicle is driven predominantly on freeways or even racetracks, if the vehicle is used predominantly for a route to work or predominantly for leisure journeys or if the vehicle is driven in particularly fuel-saving fashion. Furthermore, the profile comprises preferred routes or route sections, preferred weather situations and preferred destinations for traveling a route. The profile information is ascertained by the personal virtual agent autonomously based on driving information transmitted by the vehicle. Additionally, the user prescribes profile information as a setting. The profile creation module 34 is designed to create profiles for a plurality of users.

The journey route planning system 10 additionally comprises an information database 38 containing route-relevant supplementary information. The personal virtual agent 12 comprises a supplementary information interface device 40 for communication with the information database 38 containing route-relevant supplementary information. Accordingly, the information database 38 containing route-relevant supplementary information has a communication link to the personal virtual agent 12 via the supplementary information interface device 40. The information database 38 containing route-relevant supplementary information comprises any type of information that has relevance in regard to the selection of the route at the desired time. The supplementary information in this case comprises weather information, traffic information, i.e. information about congestion, road-works and other aspects with resultant effects on a journey time or availability of the route, and information about traffic monitoring devices.

The journey route planning system 10 additionally comprises a security module 42. The personal virtual agent 12 comprises a security interface device 44 for communication with the security module 42. Accordingly, the security module 42 has a communication link to the personal virtual agent 12 via the security interface device 44. The security module 42 causes secure communication via the interface devices of the personal virtual agent 12. Furthermore, access to the personal virtual agent 12 is limited to authorized users of the vehicle.

The journey route planning system 10 likewise comprises a voice control module 46. The personal virtual agent 12 comprises a communication interface device 48 for communication with the voice control module 46. Accordingly, the voice control module 46 has a communication link to the personal virtual agent 12 via the communication interface device 48. The voice control module 46 is in this case an externally connected voice control module 46, which in this case is embodied as a "Cortana" module.

The various interface devices 16, 20, 24, 28, 32, 36, 40, 44, 48, i.e. the user interface device 16, the vehicle interface device 20, the route interface device 24, the memory interface device 28, the MMI interface device 32, the profile interface device 3, the supplementary information interface device 40, the security interface device 44 and the communication interface device 48, are used for communication between the personal virtual agent 12 and the applicable memories, i.e. the user-specific information memory 14, the vehicle-specific information memory 18, the information memory for routes 22 and the information database 38 containing route-relevant supplementary information, or functional modules, i.e. the memory module 26, the MMI module 30, the profile creation module 34, the security module 42 and the voice control module 46.

The interface devices 16, 20, 24, 28, 32, 36, 40, 44, 48 may therefore be embodied identically in principle, i.e. the interface devices 16, 20, 24, 28, 32, 36, 40, 44, 48 can use an identical transmission protocol and, by way of example, may be connected via an identical communication bus. This is depicted by way of example for the vehicle interface device 20, the route interface device 24 and the supplementary information interface device 40, since they are formed together.

The interface devices 16, 20, 24, 28, 32, 36, 40, 44, 48 are in this case using an API as software. For the purpose of transmitting the information, the hardware uses an arbitrary network connection, which in this case is a combination of a wired and wireless network and comprises an Internet connection.

Figure 2:
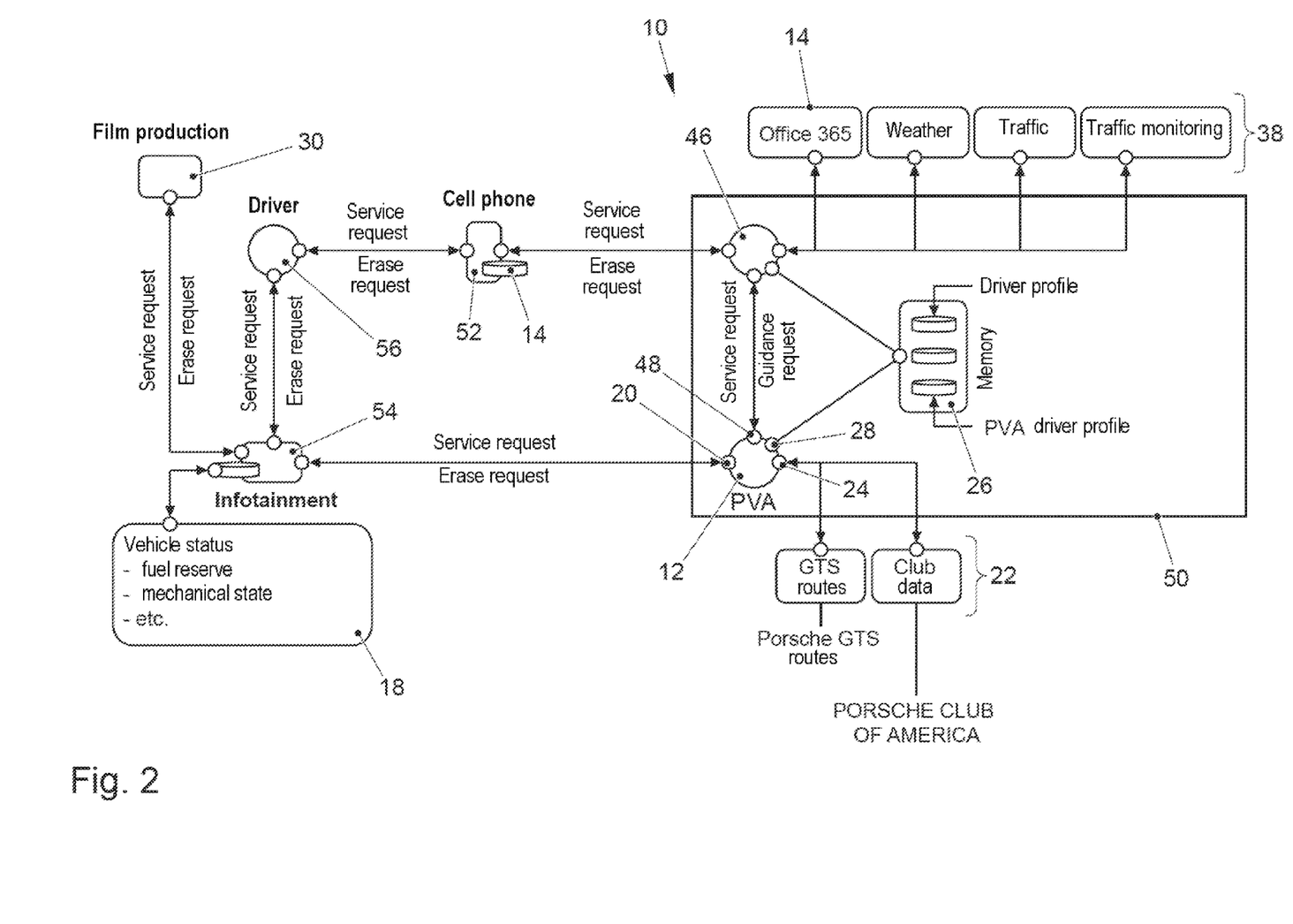
FIG. 2 shows a schematic depiction of a practical realization of the software implementation of the journey route planning system according to a second embodiment having the personal virtual agent from FIG. 1.

FIG. 2 shows a practical realization of the software implementation of the journey route planning system 10 according to a second embodiment. In this case, the journey route planning system 10 corresponds to the journey route planning system 10 of the first embodiment.

Accordingly, a repeat description is dispensed with, and only additional details of the journey route planning system 10 of the second embodiment that have not already been described previously are discussed.

The journey route planning system 10 is in this case embodied as a distributed system and comprises a server 50, a mobile phone 52 and an infotainment system 54 of the vehicle. The mobile phone 52 and the infotainment system 54 interact with a driver 56.

The server 50 has substantial parts of the journey route planning system 10 implemented in it, for example the personal virtual agent 12, the voice control module 46 and the memory module 26. The server 50 is for its part connected to the information memory for routes 22, to the user specific information memory 14, to the information database 38 containing route-relevant supplementary information and to the vehicle-specific information memory 18 as external units. The information memory for routes 22 and the information database 38 containing route-relevant supplementary information are in this case incorporated as external databases. The user-specific information memory 14 is read firstly by means of the mobile phone 52 of the driver 56 and secondly by means of an Outlook server. The vehicle-specific information memory 18 is accessed by means of the infotainment system 54 of the vehicle.

Accordingly, the mobile phone 52 can be used to make an input for the voice control module 46, i.e. the mobile phone 52 is used as an input medium for recognizing speech. At the same time, it is used to make outputs from the personal virtual agent, so that the driver 56 can use it to make a selection, or uses it to confirm a proposal. To this end, the mobile phone has an appropriate app.

In the same way, the infotainment system 54 of the vehicle can be used as a user interface for the journey route planning system 10.

The MMI module 30 is in this case fitted in the vehicle in order to produce video recordings during a journey. The MMI module 30 is in this case actuated by the personal virtual agent 12 via the infotainment system 54 of the vehicle.

Figure 3:
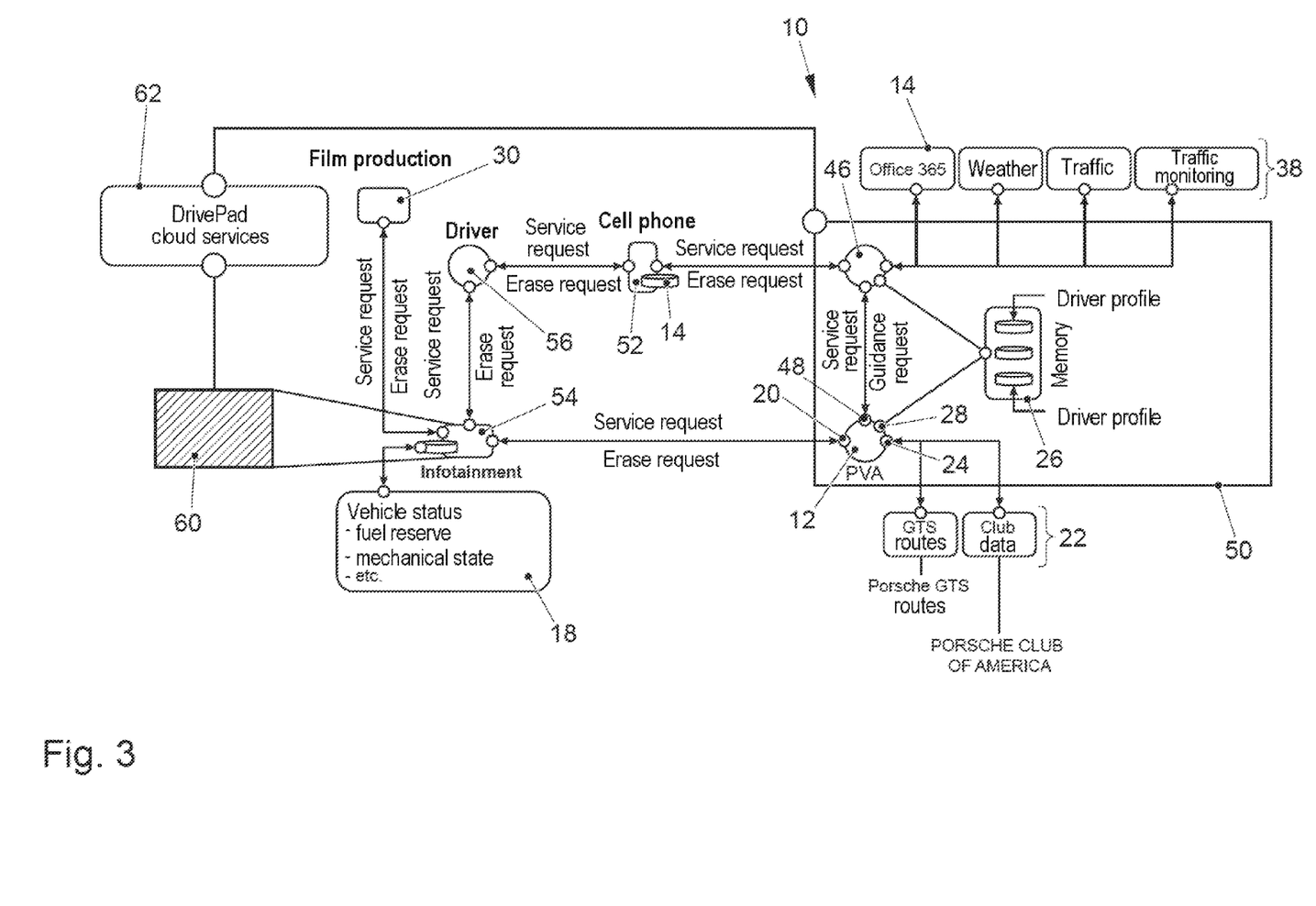
FIG. 3 shows a schematic depiction of a practical realization of the software implementation of the journey route planning system according to a third embodiment having the personal virtual agent from FIG. 1.

FIG. 3 shows a practical realization of the software implementation of the journey route planning system 10 according to a third embodiment. In this case, the journey route planning system 10 corresponds to the journey route planning system 10 of the second embodiment.

Accordingly, a repeat description is dispensed with, and only additional details of the journey route planning system 10 of the third embodiment that have not already been described previously are discussed.

In addition to the journey route planning system 10 of the second embodiment, the journey route planning system 10 of the third embodiment comprises a tablet computer 60, which is firstly connectable to the infotainment system 54 of the vehicle and secondly accesses additional cloud services 62. The access to the cloud services 62 is controlled in concordance with the server 50.

An application of the journey route planning system 10 is described below.

The personal virtual agent 12 checks, in the user-specific information memory 14, an availability of the driver 56 on a particular date to travel a route that is yet to be stipulated. A diary of the driver 56 is thus checked. The outcome of this is that the driver 56 is still available for the whole day on that day according to the diary.

The personal virtual agent 12 then ascertains a whereabouts of the driver 56 by virtue of a piece of position information of the mobile phone 54 being checked. The personal virtual agent 12 then receives various routes from the information memory for routes 22 as proposals for the route. The routes are in this case circular routes that are traveled merely for pleasure. Corresponding routes are stored in the information memory for routes 22. The received routes are selected, so that their start and destination are in proximity to the whereabouts of the driver 54.

Subsequently, a route characteristic is generated from the proposed routes. Moreover, a driver profile of the driver 54 is received from the memory module 26. In addition, the personal virtual agent 12 receives supplementary information in the form of sunrise and sunset times on the day at the location of the respective route. In the process, visibility conditions along the respective route are checked. Additionally, a weather forecast is received as supplementary information in order to check weather conditions and hence also visibility conditions along the respective route further. The supplementary information is received from the information database 38 containing route-relevant supplementary information.

A selection for a route is then made in a further step. The selection is made such that a check is performed to determine which route characteristic best matches the driver profile of the driver 54, and whether the route characteristic can also be realized as such depending on the supplementary information. In the process, a temperature and probability of rain are also taken into consideration, these decisively influencing road grip during driving.

Against this background, a best time for traveling the route is ascertained based on the times for sunrise and sunset and also the weather forecast.

In a further step, the personal virtual agent 12 receives as supplementary information a congestion forecast from the information database 38 containing route-relevant supplementary information. The selected route is checked based on the congestion forecast. If the chosen route is affected by a congestion forecast, a different route is chosen as described previously.

In a next step, the personal virtual agent 12 receives vehicle status information from the vehicle-specific information memory 18. First of all, the personal virtual agent 12 checks whether there are relevant fault reports present, or maintenance is required, for example. In that case, the personal virtual agent 12 prompts a repair or maintenance in concordance with the diary of the driver 56.

Next, the driver is offered the chosen to travel by means of the mobile phone 52. The driver 56 confirms, and the journey is entered in the diary of the driver 56. Otherwise, no further proposals are made for this period.

On the scheduled day for traveling the route, the personal virtual agent 12 checks the actual conditions in regard to traffic and weather, as has already been described above, by accessing the information database 38 containing route-relevant supplementary information. This check can take place two hours before the beginning of the journey, for example. The state of the vehicle is also checked again in order to ensure good running order.

If there is a discrepancy from the scheduled conditions at this juncture, the driver 56 is asked whether he wishes to travel the route. If not, a selection for another route can be made, or traveling the route is abandoned.

If the journey is made, the personal virtual agent 12 reminds the driver 56 at the scheduled beginning of the journey. It receives a location of the vehicle and takes the driver to his vehicle using navigation information that is output by means of the mobile phone 52. If possible, the personal virtual agent 12 prompts the vehicle to be autonomously taken out of its parking space in advance.

After the beginning of the journey, the personal virtual agent 12 uses the infotainment system 54 of the vehicle to provide navigation information for traveling the route. In the process, any necessary refueling stops are also taken into consideration. While the route is being traveled, all conditions, particularly the weather, the vehicle status and traffic information, are continually checked, for example at intervals of 5 minutes. In the event of changing conditions, the personal virtual agent 12 adjusts the route, for example if congestion has arisen, or proposes to the driver 56 that the journey be aborted.

LIST OF REFERENCE SYMBOLS

Journey route planning system 10
Personal virtual agent 12
User-specific information memory 14
User interface device 16
Vehicle-specific information memory 18
Vehicle interface device 20
Information memory for routes 22
Route interface device 24
Memory module 26
Memory interface device 28
MMI module 30
MMI interface device 32
Profile creation module 34
Profile interface device 36
Information database 38
Supplementary information interface device 40
Security module 42
Security interface device 44
Voice control module 46
Communication interface device 48
Server 50
Mobile phone 52
Infotainment system 54
Driver 56
Tablet computer 60
Cloud services 62

What is claimed is:

1. A personal virtual agent for journey planning for a user of a vehicle, the personal virtual agent comprising:
a central processing unit of a server external to the vehicle;
a vehicle infotainment system within the vehicle separate from the user mobile device, wherein the central processing unit of the server is configured to:
(i) receive user information from a user mobile device within the vehicle, the user information including (a) a calendar of availability for the user and (b) personal preferences of the user including (i) driving style, (ii) one or more preferred routes, (iii) preferred weather, and (iv) one or more preferred destinations,
(ii) receive vehicle information from the vehicle infotainment system, the vehicle information indicating operational status of the vehicle,
(iii) receive routes from another server,
(iv) determine a time window for travel on a future date based on the calendar of availability,
(v) select a route from the received routes based on the user information received from the user mobile device, based on the vehicle information received from the vehicle infotainment system, based upon said personal preferences of the user, and based on the determined time window for travel on the future date such that the selected route is able to be completed within the time window for travel on the future date,
(vi) present the selected route to the user,
(vii) upon receiving an indication that the user has accepted the selected route, save the selected route to the calendar of availability,
(viii) on the day of the future date and prior to the determined time window for travel, determine weather and traffic conditions along the selected route, and
(ix) present the user with a selection for an alternative route based on the determined weather and traffic conditions along the selected route.

2. The personal virtual agent as claimed in claim 1, wherein the personal virtual agent has a communication interface device for communication with at least one voice control module.

3. The personal virtual agent as claimed in claim 1, wherein the personal virtual agent has a memory interface device for communication with at least one memory module.

4. The personal virtual agent as claimed in claim 1, wherein the personal virtual agent has a multi-media (MMI) interface device for communication with at least one MMI module.

5. The personal virtual agent as claimed in claim 1, wherein the personal virtual agent has a profile interface device for communication with at least one profile creation module.

6. The personal virtual agent as claimed in claim 5, wherein the at least one profile creation module is configured to create a user profile comprising the personal preferences of the user including (i) the driving style, (ii) the one or more preferred routes, (iii) the preferred weather, and (iv) the one or more preferred destinations.

7. The personal virtual agent as claimed in claim 1, wherein the personal virtual agent has a supplementary information interface device for communication with at least one information database containing route-relevant supplementary information.

8. The personal virtual agent as claimed in claim 1, wherein the personal virtual agent has a security interface device for communication with at least one security module.

9. A vehicle having the personal virtual agent as claimed in claim 1.

10. The personal virtual agent as claimed in claim 1, wherein the central processing unit abandons another route from the received routes when the another route cannot be completed within the time window for travel.

11. The personal virtual agent as claimed in claim 1, wherein the central processing unit selects the route based on a designation made by the user indicating a purpose of the route.

12. The personal virtual agent as claimed in claim 1, further comprising at least one information memory for routes that has a communication link to the personal virtual agent via a route interface device.

13. The personal virtual agent as claimed in claim 12, further comprising a user-specific information memory, wherein the central processing unit of the server is further configured to receive a plurality of routes from the at least one information memory for routes by taking into consideration information from the user-specific information memory.

14. The personal virtual agent as claimed in claim 12, further comprising a user-specific information memory and a vehicle-specific information memory, wherein the central processing unit of the server is further configured to receive a plurality of routes from the at least one information memory for routes by taking into consideration information from the user-specific information memory and the vehicle-specific information memory.

15. The personal virtual agent as claimed in claim 1, wherein the preferred weather is a personal preference of the user for a preferred weather when driving the one or more preferred routes.

16. The personal virtual agent as claimed in claim 1, further comprising planning leisure driving routes based on the calendar of availability for the user and an anticipated location of the user, without receiving instructions from the user.

17. The personal virtual agent as claimed in claim 16, further comprising storing the leisure driving routes in a memory and selecting at least one leisure route based on the calendar of availability for the user and the anticipated location of the user, without receiving instructions from the user.

18. The personal virtual agent as claimed in claim 1, further comprising checking whether a repair or maintenance of the vehicle is required and scheduling the repair or the maintenance based on the calendar of availability for the user.

19. The personal virtual agent as claimed in claim 18, wherein the checking whether a repair or maintenance of the vehicle is required comprises checking whether fault reports are present.

20. The personal virtual agent as claimed in claim 1, wherein access to the personal virtual agent is limited to authorized users of the vehicle.

21. The personal virtual agent as claimed in claim 1, further comprising a security module having recognition means configured to recognize an authorized user of the vehicle.

22. A method for journey planning for a user of a vehicle, comprising the steps of:

receiving, by a server external to the vehicle, user-specific information from a user mobile device within the vehicle, the user-specific information including (a) a calendar of availability of the user, and (b) personal preferences of the user including (i) driving style, (ii) one or more preferred routes, (iii) preferred weather, and (iv) one or more preferred destinations;

receiving, by the server, vehicle-specific information from a vehicle infotainment system within the vehicle, the vehicle-specific information indicating operational status of the vehicle;

receiving, by the server, routes from another server;

determining, by the server, a time window for travel on a future date based on the calendar of availability;

selecting, by the server, a route from the received routes based on the user-specific information received from the user mobile device, based upon said personal preferences of the user, based on the vehicle-specific information received from the vehicle infotainment system, and based on the determined time window for travel on the future date such that the selected route is able to be completed within the time window for travel on the future date;

presenting the selected route to the user;

upon receiving an indication that the user has accepted the selected route, saving the selected route to the calendar of availability;

on the day of the future date and prior to the determined time window for travel, determining, by the server, weather and traffic conditions along the selected route; and presenting the user with a selection for an alternative route based on the determined weather and traffic conditions along the selected route.

* * * * *